Patented Apr. 8, 1930

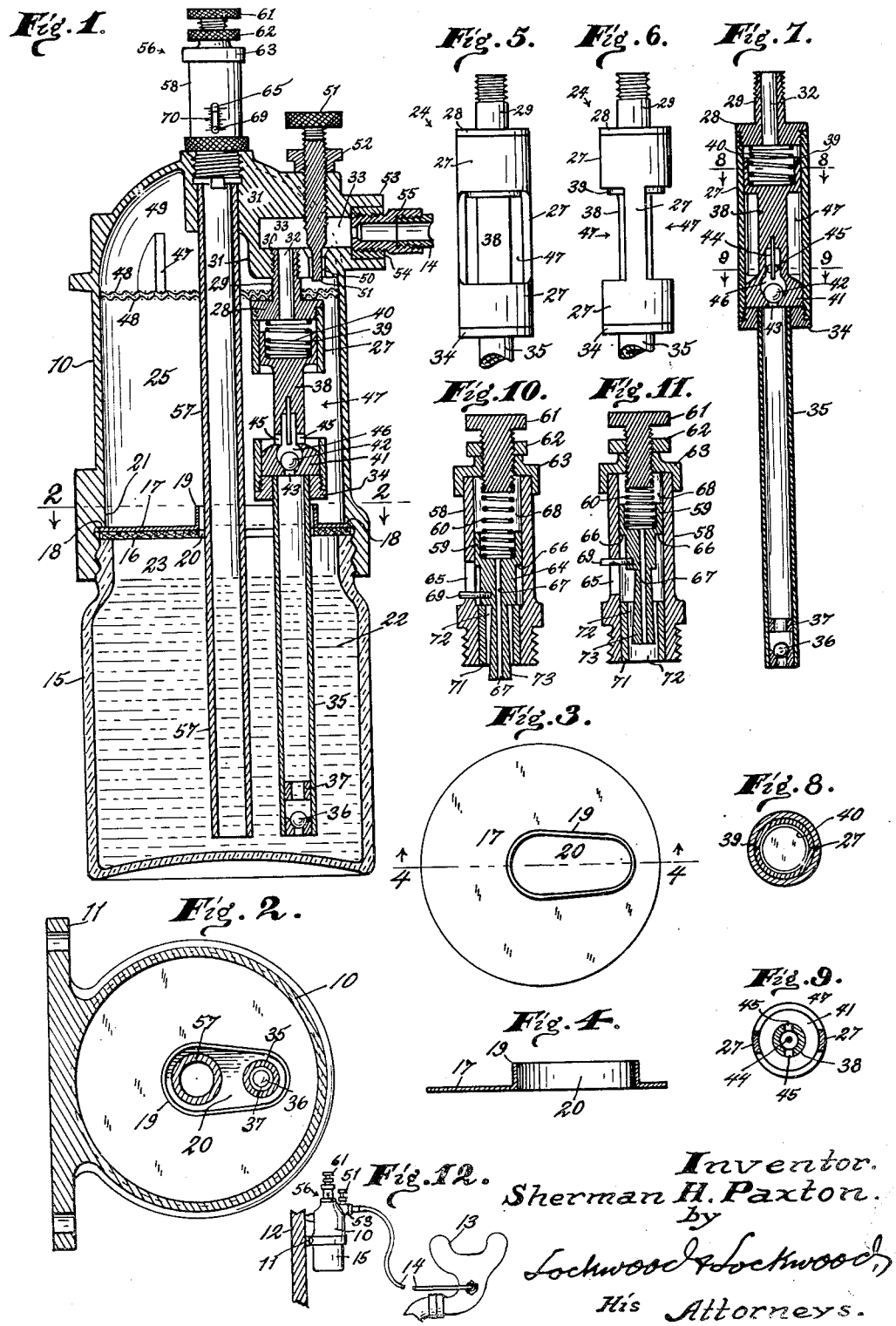

1,753,718

UNITED STATES PATENT OFFICE

SHERMAN H. PAXTON, OF LOS ANGELES, CALIFORNIA, ASSIGNOR TO JAY MANUFACTURING CO., OF LOS ANGELES, CALIFORNIA, A CORPORATION OF CALIFORNIA

LUBRICATOR

Application filed May 7, 1929. Serial No. 361,121.

This invention relates to an apparatus for lubricating the cylinders of internal combustion engines, and the principal object is to provide a lubricator in which there is a main supply chamber adapted to hold a considerable quantity of lubricant that is gradually transferred to a supply pan above the main chamber to maintain a constant level in the pan so that an increased suction will not be required to maintain a relatively even supply of lubricant to the engine cylinders as the level of the lubricant in the main supply chamber is gradually lowered.

Another object of the invention is to increase the efficiency of the lubricator to supply saturated air to the engine cylinder which is accomplished by supplying a simple means for circulating the lubricant so as to cause an effective mixing with the air. In other words I provide a pump for transferring the lubricant from the main chamber into a pan with the latter so arranged that the overflow lubricant falls back with a splash into the lubricant in the main chamber and when so circulated is caused to mix with the air.

A feature of invention is shown in the construction, arrangement and operation of the pump which, when in operation, is constantly throwing drops of lubricant out of the pump windows into the supply pan so that a mixing of the air and lubricant is effected.

Another object of the invention is to provide a lubricator with an air inlet control having an indicator scale with means connected thereto for regulating the inlet of air proportional to the suction on the lubricator outlet so that the metering pin of the outlet can be set relative to the metering pin of the inlet.

Other features of invention may appear from the accompanying drawings, the subjoined detailed description and the appended claims.

The accompanying drawings illustrate the invention.

Fig. 1 is a central vertical section through a lubricator constructed in accordance with this invention.

Fig. 2 is a cross section on the line 2—2, Fig. 1, showing the arrangement of the supply pan in the lubricator; and its overflow wall around the centrally arranged opening through the pan.

Fig. 3 is a plan view of the supply pan detached from the lubricator.

Fig. 4 is a central section through the supply pan on the line 4—4, Fig. 3.

Fig. 5 is a fragmental side view of the pump detached from the lubricator showing one of the side windows.

Fig. 6 is another fragmental view of the pump showing an edge view of both side windows.

Fig. 7 is a central vertical section of the pump in Fig. 6, showing a detailed construction of the pump.

Fig. 8 is a cross section on line 8—8, Fig. 7.

Fig. 9 is another cross section on line 9—9, Fig. 7, showing the ports arranged to discharge the lubricant out through the pump windows.

Fig. 10 is a central vertical section through the metering air inlet plug.

Fig. 11 is a view analogous to Fig. 10 showing an altered position of the meter piston.

Fig. 12 is a diagrammatic view of the lubricator connected to the inlet manifold of an engine not shown; also showing in section a fragmental part of a vehicle dash-board to which the lubricator is usually attached.

The lubricator includes a housing 10 having lugs 11 that can be secured to a dash-board 12 to the body or frame of a vehicle in a position where it is preferably above the level of the inlet manifold 13 of an engine; and the housing is connected to the manifold by a pipe 14, as indicated in Fig. 10.

A container, preferably a glass jar 15, is secured to the bottom of the housing 10 so that it pinches a gasket 16 and metal plate 17 up against a shoulder 18 in the housing so as to form a gas-tight fit.

The plate 17 is provided with an upwardly extending overflow wall 19 around an opening 20 therethrough and this wall, together with the plate 17 and the inner wall 21 of the housing form a pan for holding a predetermined amount of lubricant above the main supply of lubricant 22 in the chamber 23.

A pump 24 is arranged in an upper chamber 25 in the housing 10 in position to pump lubricant from the chamber 23 up into the pan to maintain a constant level therein, which level is at the top of the wall 19 so that any excess lubricant raised by the pump will run over the wall 19 and fall through the opening 20 back into the chamber 23.

There are two purposes for transferring the lubricant from the chamber to the pan; and the first is to maintain a constant level in the pan adjacent to the outlet from the lubricator so that a relatively even uniform flow of the lubricant saturated air to the engine cylinders can be accomplished without increasing the suction which is necessary if the fuel level is gradually decreased as heretofore in appliances of this nature.

The second purpose is to circulate the lubricant so as to cause a more satisfactory mixture of air and lubricant. This is accomplished by causing the overflow of lubricant from the pan to fall back through the air current passing from the lower chamber 23 through the opening 20 into the upper chamber 25.

In other words the overflow lubricant falls with a splash on to the top surface of the lubricant in the chamber 23 and in falling passes downward through an upwardly flowing air current so that part of this moving lubricant remains in the air to form a mixture suitable for lubricating the engine cylinders, and by the foregoing means a very thorough and satisfactory mixing of air and lubricant is accomplished.

The pump 24 includes a cylinder 27 having its upper end closed by a plug 28 that has a hollow threaded stem 29 secured in a socket 30 in a boss 31 so that the passage 32 through the stem opens into a suction chamber 33 in the boss 31, and as thus secured the stem holds the pump suspended in the lubricator.

The lower end of the cylinder 27 is closed by a plug 34 to which the upper end of the draw pipe 35 is secured. This pipe extends down through the opening 20 with its lower end suspended adjacent the bottom of the container 15; and a ball check valve 36 is arranged in its lower end, with a stop 37 above it. The purposes of the check valve and stop are well known.

A piston 38 is arranged in the cylinder 27 so that it can be reciprocated between the plugs to lift the lubricant from the chamber 23 and discharge it into the fuel level pan. The piston 38 has a hollow upper head 39 in which a spring 40 is seated and this spring normally acts to force the piston downward toward the plug 34; and the piston is lifted against the spring 40 by suction through the passage 32.

The piston 38 also has a lower head 41 in which a check valve 42 is arranged to hold the lubricant from flowing downward when lifted through the passage 43 to a position above this valve. A stop 44 is arranged above the ball 42 to limit its upward movement. The piston is provided with two oppositely arranged ports 45 through which the lubricant is discharged from the valve chamber 46 and when so discharged it is thrown outwardly through oppositely arranged windows 47 in the cylinder to fall into the fuel level pan.

Just above the pump 24 and fitted against the lower end of the ribs 47 are two fine mesh wire screens 48 that separate the space in the housing into upper and lower chambers 25 and 49; and these screens are adapted to prevent heavy particles of the lubricant from being carried by suction into the discharge outlet passage 50 that leads from the chamber 49 into the chamber 33.

A screw actuated metering pin 51 is provided for controlling the discharge of saturated air through the passage 50. A lock nut 52 is provided for holding the pin 51 in a fixed position when properly adjusted.

Adjacent the chamber 33 the housing 10 is provided with a boss 53 in which a threaded bushing 54 is secured for the pipe fitting 55 to which one end of the pipe 14 is secured so that intermittently the chamber in said housing is subjected to suction when the engine is running.

Air is admitted to the lubricator through the metering plug 56 that is secured in the upper end of the housing 10 so that air passing into the plug can be drawn downward by suction through the pipe 57 so it will bubble up through the lubricant 22 in the chamber 23, the pipe being suspended so that its discharge end is adjacent the bottom of the container 15; also this pipe extends through the opening 20 in the fuel level pan.

The metering plug 56 includes a barrel 58 in which a piston 59 is arranged to move upward against the spring 60 that has one end seated in a recess in the piston and the other end secured to an adjusting screw 61 that is held in adjusted position by a lock nut 62 that screws down on a cap 63 that closes the upper end of the barrel.

The piston has a reduced portion 64 so that air entering the inlet passage 65 can circulate entirely around the part 64 to help lift upward on the shoulder 66 of the piston to force it toward the spring when suction through the center passage 67 causes a vacuum in the spring chamber 68.

A guide pin 69, secured to the part 64, is extended through the passage 65, and in addition to guiding the piston and holding it from rotation in the barrel, also functions as a pointer for the scale 70 that indicates the amount of suction that is applied to the piston 59.

A bushing 71 is secured in the lower end of the barrel 58 and has a passage 72 therethrough that has its upper end normally closed by the lower end of the part 64, as shown in Fig. 10; and extending downward from the part 64 is a metering pin 73 that controls the passage of air through the bushing 71 to the pipe 57. The pin 73 is tapered with its free end the largest so that the higher the piston is lifted by suction the less air will be admitted into the lubricator and vice versa. The bushing 71 can be replaced by another one having either a larger or smaller passage 72 so that either an increased or reduced supply of air can be obtained additional to the adjustment of the screw 61.

The scale 70 is provided so that the metering pin 51 and screw 61 can be adjusted relative to one another so as to permit a proper inlet of air through the plug 56 and a proper discharge of saturated air from the lubricator.

In operation the lubricator is connected to an automobile so that it is above the level of the inlet manifold of the engine as indicated in Fig. 12; then when the engine is operating suction through pipe 14 will draw off saturated air from the chamber 49 to lubricate the engine cylinders. Then the metering pin 51 and screw 61 are adjusted to apply the proper suction to the lubricator to intake air, operate the pump and supply the saturated air to the engine efficiently and economically; and in adjusting those parts the scale and pointer pin will aid in determining their proper positions.

When the proper suction is applied to the lubricator the pump will be operated to maintain a constant level in the pan, and also circulate the lubricant so as to effect a very satisfactory mixture of the air and lubricant as previously indicated.

I claim as my invention:

1. A lubricator including a housing having a chamber therein, a pipe connection from said housing to the inlet manifold of an engine whereby said chamber is intermittently subjected to suction when the engine is operated, a container secured to the lower end of said housing, a pan in said housing, an overflow wall to said pan that is arranged around an opening through said pan, and a pump in said housing that is actuated by suction from the engine for transferring lubricant from said container to maintain a constant level in said pan.

2. A lubricator including a housing having a chamber therein, a pipe connection from said housing to the inlet manifold of an engine whereby said chamber is intermittently subjected to suction when the engine is operated, a container secured to the lower end of said housing that is adapted to hold a quantity of lubricant, a pan in said housing, a pump in said housing, a piston in said pump that is lifted by suction to transfer lubricant from said container to said pan, and other means for reversely moving said piston.

3. A lubricator including a housing having a chamber therein, a pipe connection from said housing to the inlet manifold of an engine whereby said chamber is intermittently subjected to suction when the engine is operated, a container secured to the lower end of said housing that is adapted to hold a quantity of lubricant, a pan in said housing, a pump suspended in said housing, a piston in said pump that is lifted by suction to transfer lubricant from said container to said pan, other means for reversely moving said piston, and means connected with said pan whereby the excess lubricant lifted by said pump is discharged back into said container.

4. In a lubricator the combination of a housing having an air inlet, adjustable means for controlling the inlet, a container secured to said housing that is adapted to hold a quantity of lubricant, a pan interposed between said housing and said container, an overflow wall surrounding an opening through said pan, a pump in said housing for transferring lubricant from said container to maintain a constant level in said pan, a discharge outlet from said housing that is connected by a pipe with the inlet manifold of an engine, and adjustable means for controlling the outlet from said housing.

5. In a lubricator the combination of a housing having an air inlet, a metering pin for regulating the flow of air through said inlet, a container secured to said housing that is adapted to hold a quantity of lubricant, a pan interposed between said housing and container, an overflow wall surrounding an opening through said pan, a pump in said housing for maintaining a constant level of lubricant in said pan, means for actuating said pump, said means including a pipe connection from an outlet from said housing to the inlet manifold of an engine for lifting a piston in said pump, and a spring for reversely moving said piston, and another metering pin for controlling the outlet from said housing.

6. In a lubricator the combination of a housing, a container secured thereto that is adapted to hold a quantity of lubricant, means in connection with said housing and container for supplying a mixture of air and lubricant to the cylinder of an engine, a metering plug for regulating the intake of air into said housing, a barrel to said plug, a piston in said plug that normally closes a passage into said housing, and means whereby suction in said housing raises said piston to open the inlet passage.

7. In a lubricator the combination of a housing, a container secured thereto that is adapted to hold a quantity of lubricant, means in connection with said housing and container for supplying a mixture of air and lubricant to the cylinders of an engine, a metering plug for regulating the intake of air into said housing, a barrel to said plug, a piston in said barrel, a spring for holding said piston in position to normally close a passage into said housing, a metering pin on said piston for regulating said passage, and means whereby suction in said housing moves said piston against the tension of said spring to open said passage and move said metering pin in position to regulate the amount of air flowing through said passage.

8. In a lubricator the combination of a housing, a container secured thereto that is adapted to hold a quantity of lubricant, a pump in said housing for circulating said lubricant from said container to a pan in said housing, a pipe connection from said housing to the inlet manifold of an engine whereby suction can coact with a spring to actuate said pump, a metering plug for controlling and regulating the intake of air into said housing, a barrel to said plug, a piston in said barrel that is arranged to normally close a passage into said housing, a pin for holding said piston from rotation in said barrel, means whereby suction in said housing will lift said piston to open said passage, and a scale adjacent said pin for indicating the amount of suction on said piston.

9. In a lubricator the combination of a housing, a container secured thereto, a pan interposed between said housing and container, a pump in said housing for transferring lubricant from said container to maintain a constant level in said pan, means for actuating said pump, said means including a pipe connection from an outlet from said housing to the inlet manifold of an engine, a metering pin controlling the suction from said manifold to said housing, a meter plug for regulating and controlling the inlet of air to said housing, and a scale in connection with said plug for indicating the amount of suction in said housing, whereby said metering pin at said outlet can be adjusted relative to said scale.

10. A lubricator including a lubricant container, a pan above it having an overflow opening communicating with the container, and means for causing air to move into the container and through the overflow opening in the pan so that the air will become charged with lubricant.

11. A lubricator including a lubricant container to the lower part of which air is admitted, a pan above the container with an overflow opening so the overflow will return down to the container, means for keeping the pan filled to overflowing with lubricant from the container, and suction means for causing the air from the container to pass up through said pan overflow opening and become charged with lubricant.

12. A lubricator including a lubricant container, a housing detachably mounted upon said container, a separable pan located between said container and housing and having an overflow opening, means in said housing and container for keeping the overflow pan filled to overflowing with lubricant from the container, and means connected with the housing for causing air to move into the container and up through the overflow opening in the pan so that the air will become charged with lubricant.

In witness whereof, I have hereunto affixed my signature.

SHERMAN H. PAXTON.